United States Patent
Lee et al.

(10) Patent No.: US 8,144,201 B2
(45) Date of Patent: Mar. 27, 2012

(54) PORTABLE COMPUTER CAPABLE OF PERFORMING DIGITAL PHOTO FRAME FUNCTION UNDER MAIN-POWER-OFF STATE

(75) Inventors: Yu-chi Lee, Taipei (TW); Ching-sung Yeh, Taipei (TW)

(73) Assignee: Pegatron Corporation, Taipei (TW)

( * ) Notice: Subject to any disclaimer, the term of this patent is extended or adjusted under 35 U.S.C. 154(b) by 347 days.

(21) Appl. No.: 12/559,958

(22) Filed: Sep. 15, 2009

(65) Prior Publication Data

US 2011/0063489 A1  Mar. 17, 2011

(51) Int. Cl.
  *H04N 5/225* (2006.01)
  *H04N 5/222* (2006.01)
  *H04N 7/00* (2006.01)
  *H04N 5/63* (2006.01)
  *G06F 1/16* (2006.01)
  *G06F 3/038* (2006.01)

(52) U.S. Cl. ........... 348/207.1; 348/333.13; 348/207.99; 348/552; 348/730; 348/372; 361/679.23; 361/379.21; 345/211

(58) Field of Classification Search ............. 348/207.99, 348/207.1, 140.1, 14.04, 14.05, 730, 333.13, 348/372–376, 552; 345/211; 455/556.1; 361/679.23, 679.22, 679.21
See application file for complete search history.

(56) References Cited

U.S. PATENT DOCUMENTS

| 2005/0068423 | A1* | 3/2005 | Bear et al. ................ 348/207.99 |
| 2005/0283812 | A1 | 12/2005 | Soo et al. |
| 2006/0248363 | A1* | 11/2006 | Chen et al. .................... 713/300 |
| 2007/0136774 | A1* | 6/2007 | Lourie et al. .................. 725/105 |
| 2007/0228138 | A1* | 10/2007 | Huang et al. .................. 235/375 |

OTHER PUBLICATIONS http://www.eettaiwan.com/ART_8800420968_480702_NT-c0394c49.HTM.
http://tech.sina.com.cn/n/2007-01-08/0928210664.shtml.
http://event.asus.com/2007/nb/w5fe/pt/.
http://www.enet.com.cn/article/2007/1223/A20071223964257.shtml.
http://www.benq.com/products/joybook/?product=1257.

* cited by examiner

*Primary Examiner* — Lin Ye
*Assistant Examiner* — Marly Camargo
(74) *Attorney, Agent, or Firm* — Thomas, Kayden, Horstemeyer & Risley, LLP

(57) ABSTRACT

This invention discloses a portable computer capable of performing a digital photo frame function under a main-power-off state. The portable computer includes a base, a display device, an image capturing device, an image capturing switch, and a processor. The display device includes a frame pivotally connected to the base. The image capturing device and the image capturing switch are disposed at the frame. The image capturing switch is operated to output a first request signal to the processor. In response to the first request signal, the processor drive the image capturing device to capture a first image under the main-power-off state, and the processor instantly displays the first image on the display device under the main-power-off state.

9 Claims, 3 Drawing Sheets

PORTABLE COMPUTER CAPABLE OF PERFORMING DIGITAL PHOTO FRAME FUNCTION UNDER MAIN-POWER-OFF STATE

BACKGROUND OF THE INVENTION

1. Field of the Invention

The invention relates to a portable computer and, more particularly, to a portable computer capable of performing a digital photo frame function under a main-power-off state.

2. Description of the Related Art

In the prior art, it is common for a user to display photos by a portable computer. However, when the user is to display the photos by the portable computer, he or she generally needs to turn on main power of the portable computer to start an operating system of the portable computer. Then, the user still needs to perform a program suitable for the files needed to be displayed, thus to display the photos. In a conventional portable computer, the time of a starting-up process is about one to three minutes. In addition, after the computer enters an operating interface of the operating system, since data of different applications and peripheral equipment is stored at different places, the user has to repeatedly operate a mouse or a keyboard to display the photos. The operation time may be different with the time for searching the places where the photos are stored by the user. The starting-up process and the operation process are rather inconvenient for the users. Thus, the users may dislike displaying the photos by the computer, and thus the computer resources may fail to be sufficiently used.

In recent years, with the development of personal computers, different information electronic devices have gradually replaced different conventional devices. Digital photo frames integrating a memory card reader or other storage devices, a display, a man-machine interface, and a corresponding controlling system are widely accepted by people. A conventional portable computer has the similar electronic elements with the digital photo frame. If the digital photo frame can be integrated into the portable computer, and the user can use the portable computer to perform the digital photo frame function under a main-power-off state, the user does not need to buy the digital photo frame with additional cost. Thereby, the usage is convenient, and the utility rate of the portable computer also increases.

BRIEF SUMMARY OF THE INVENTION

One objective of this invention is to provide a portable computer capable of performing a digital photo frame function conveniently and fast under a main-power-off state.

According to one embodiment of the invention, the portable computer includes a base, a display device, an image capturing device, an image capturing switch, and a processor. The display device includes a frame pivotally connected to the base. The image capturing device and the image capturing switch are disposed at the frame. When a user is to capture images, he or she can press the image capturing switch to output a first request signal to the processor. At that moment, in response to the first request signal, the processor drives the image capturing device to capture a first image under the main-power-off state and instantly displays the first image on the display device under the main-power-off state.

In the embodiment, the portable computer may further include a first storage device. The first storage device may be electrically connected with the processor. When the first image is captured, the processor may store the captured first image to the first storage device. In addition, the portable computer may further include an image playing switch disposed at the frame of the display device. When the user is to display images, he or she can press the image playing switch to output a request signal to the processor. Then, the processor may display the images stored in the first storage device on the display device under the main-power-off state.

Therefore, the portable computer provided by the invention allows the users to fast and conveniently display the images in the storage device under the main-power-off state. In addition, the users only need to press the image capturing switch. Thus, the images are instantly captured under the main-power-off state and the captured images are displayed on the display device. In addition, the captured images can be stored in the storage device for being displayed later. In this invention, basic elements of the portable computer are in cooperation with specific man-machine interface switches to realize the digital photo frame function under the main-power-off state.

These and other features, aspects, and advantages of the present invention will become better understood with regard to the following description, appended claims, and accompanying drawings.

DETAILED DESCRIPTION OF THE INVENTION

Figure 1:
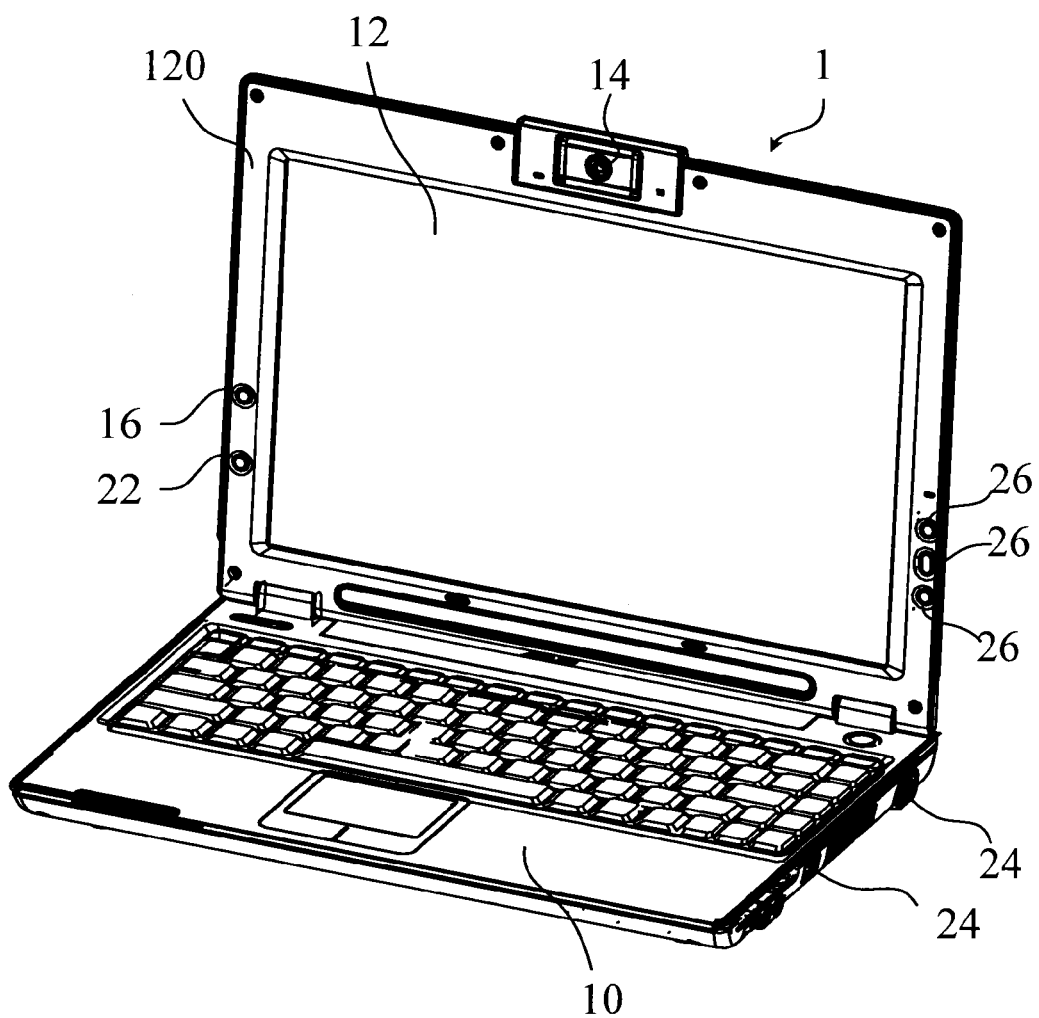
FIG. 1 is a schematic diagram showing an appearance of a portable computer according to one embodiment of the invention.
Figure 2:
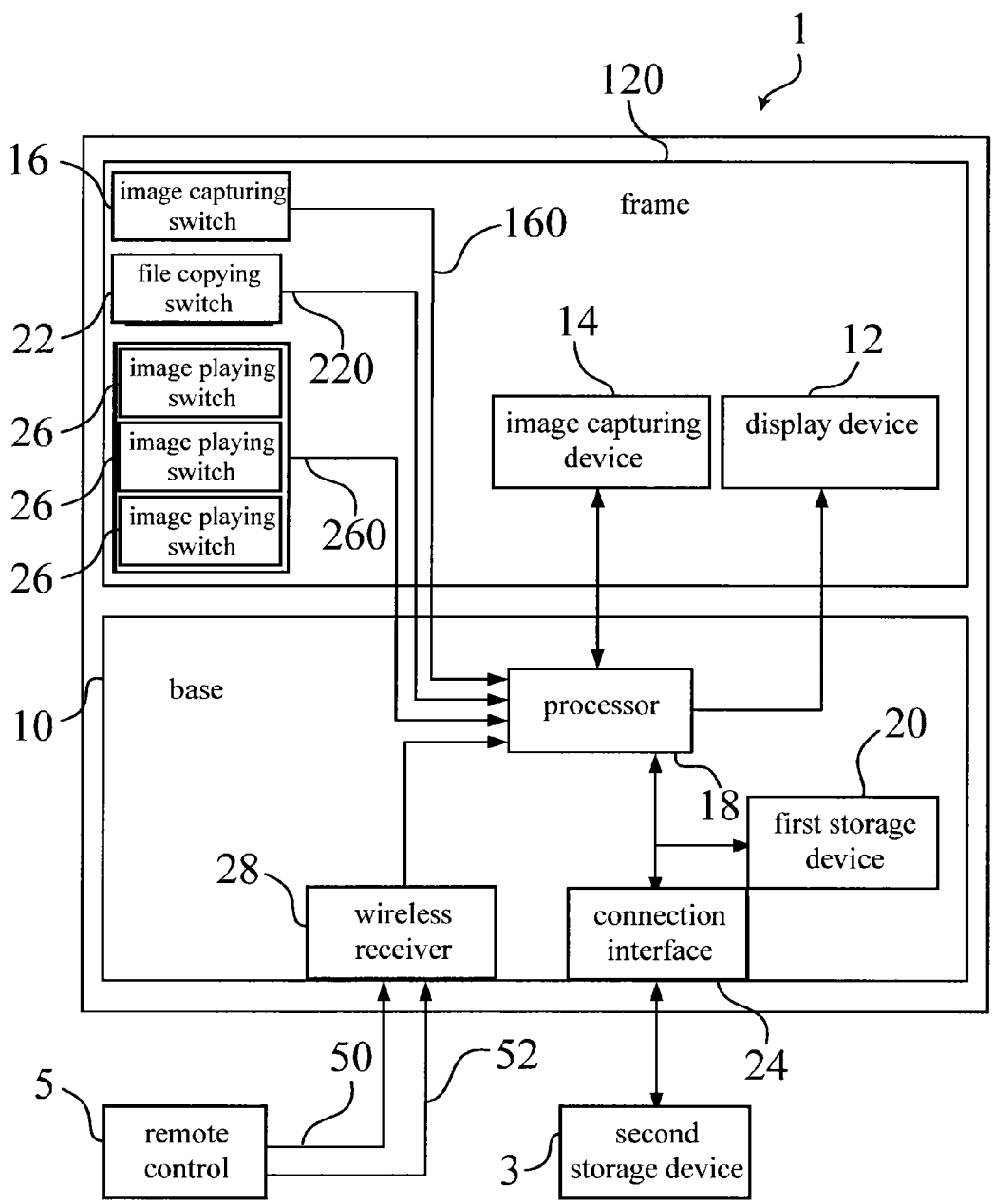
FIG. 2 is a functional block diagram showing the portable computer in FIG. 1.

FIG. 1 is a schematic diagram showing an appearance of a portable computer 1 according to one embodiment of the invention. FIG. 2 is a functional block diagram showing the portable computer 1 in FIG. 1. Please refer to FIG. 1 and FIG. 2. The portable computer 1 includes a base 10, a display device 12, an image capturing device 14, an image capturing switch 16, a processor 18, and a first storage device 20.

In FIG. 1, the display device 12 includes a frame 120 pivotally connected to the base 10. In other words, a user can open or close the display device 12 relative to the base 10. The image capturing device 14 and the image capturing switch 16 are disposed at the frame 120. In FIG. 2, the processor 18 and the first storage device 20 are disposed in the base 10. The processor 18 is electrically connected with the display device 12, the image capturing device 14, the image capturing switch 16, and the first storage device 20.

In the embodiment, the display device 12 may be a liquid crystal display or other screens having a display function. The image capturing device 14 may be a charge-coupled device camera (CCD camera), a complementary metal-oxide-semiconductor camera (CMOS camera), or other active pixel sensors. The processor 18 may be a central processing unit (CPU) or other processing units.

When a user is to capture images, he or she can press the image capturing switch 16 to output a first request signal 160 to the processor 18 during the portable computer 1 is under a main-power-off state. After the processor 18 receives and recognizes the first request signal 160, it drives the image capturing device 14 to capture a first image under the main-power-off state and instantly displays the captured first image on the display device 12. Thereby, the user can operate the portable computer 1 to capture the images and to instantly display the captured images under the main-power-off state.

In addition, at the same time the processor 18 can store the captured first image to the first storage device 20. The first storage device 20 may be a hard disk or other similar storage devices. In a practical application, the first storage device 20 is generally a main storage device built in the portable computer 1, and it is mainly used as a media for storing files and operating systems.

The main-power-off state indicates that main power of the portable computer 1 does not need to be turned on, and the function can be completed only by starting part related electronic elements when the portable computer 1 does not enter the operating system. According to the above, the image capturing device 14, the display device 12, the processor 18, the first storage device 20, and necessary power modules (not shown) such as a battery, an external power transformer and so on can be started only by pressing the image capturing switch 16. The main-power-off state mentioned hereinafter conforms to the definition here that the portable computer does not enter the operating system and part related electronic elements are started only via special programs.

In the embodiment, the portable computer 1 can further include a file copying switch 22 and a connection interface 24. The file copying switch 22 is disposed at the frame 120. The file copying switch 22 and the connection interface 24 are electrically connected with the processor 18, respectively. The connection interface 24 may include at least one of a universal serial bus (USB), an IEEE 1394 specification, a serial digital input output (SDIO), or other similar memory card slot interfaces. In FIG. 2, the connection interface 24 can be used to connect a second storage device 3. In a practical application, the second storage device 3 may be a flash memory portable disk, a portable hard disk, a portable optical drive, a secure digital card (SD card), or other storage media.

When the user is to display the second image stored in the second storage device 3, he or she can connect the second storage device 3 to the connection interface 24 and then press the file copying switch 22 to output a second request signal 220 to the processor 18. In response to the second request signal 220, the processor 18 copies the second image from the second storage device 3 to the first storage device 20 under the main-power-off state. In other words, via the connection interface 24, the user can directly connect a memory card of a digital camera or a personal mobile hard disk with the portable computer 1 in the embodiment. Thus, under the main-power-off state, the currently captured photos are fast transmitted to the portable computer 1 and are displayed via the display device 12.

In the embodiment, the portable computer 1 can further include at least one image playing switch 26. In FIG. 1, the portable computer 1 includes three image playing switches 26. The number of the image playing switch 26 can be determined according to a practical application, and it is not limited to three. The image playing switches 26 are disposed at the frame 120 and are electrically connected with the processor 18, respectively.

When the user is to display the images under the main-power-off state, he or she can press the image playing switch 26 to output a third request signal 260. In response to the third request signal 260, the processor 18 displays the images stored in the first storage device 20 on the display device 12 according to a predetermined play mode by the users under the main-power-off state. Each image playing switch 26 can be designed to output a different third request signal 260 according to the users' different needs. The third request signals 260 correspond to a play instruction, respectively, such as starting play, stopping play, previous, next, reverse, forward play, reverse play, setting a play mode and so on. The play mode includes a random play mode, a mode of playing in order, or other specific play modes.

In the embodiment, the portable computer 1 can further include a wireless receiver 28. In FIG. 2, the wireless receiver 28 is disposed in the base 10 and electrically connected with the processor 18. The wireless receiver 28 is used to receive a fourth request signal 50 from a remote control 5. In response to the fourth request signal 50, the processor 18 displays the images stored in the first storage device 20 on the display device 12 under the main-power-off state. In a practical application, the remote control 5 can output different fourth request signals 50 corresponding to different play instructions according to the users' different needs. For example, the play instruction may be starting play, stopping play, previous, next, reverse, forward play, reverse play, setting a play mode and so on.

According to the users' operation, the remote control 5 can output a fifth request signal 52 transmitted to the processor 18 via the wireless receiver 28. In response to the fifth request signal 52, the processor 18 drives the image capturing device 14 to capture a third image under the main-power-off state and instantly displays the captured third image on the display device 12. In addition, the processor 18 can also store the captured third image to the first storage device 20.

The method for capturing images and copying files via the remote control 5 is the same as the method mentioned above. The difference is that in this method the request signals can be transmitted via a wireless remote control. Therefore, it is not described for a concise purpose.

Figure 3:
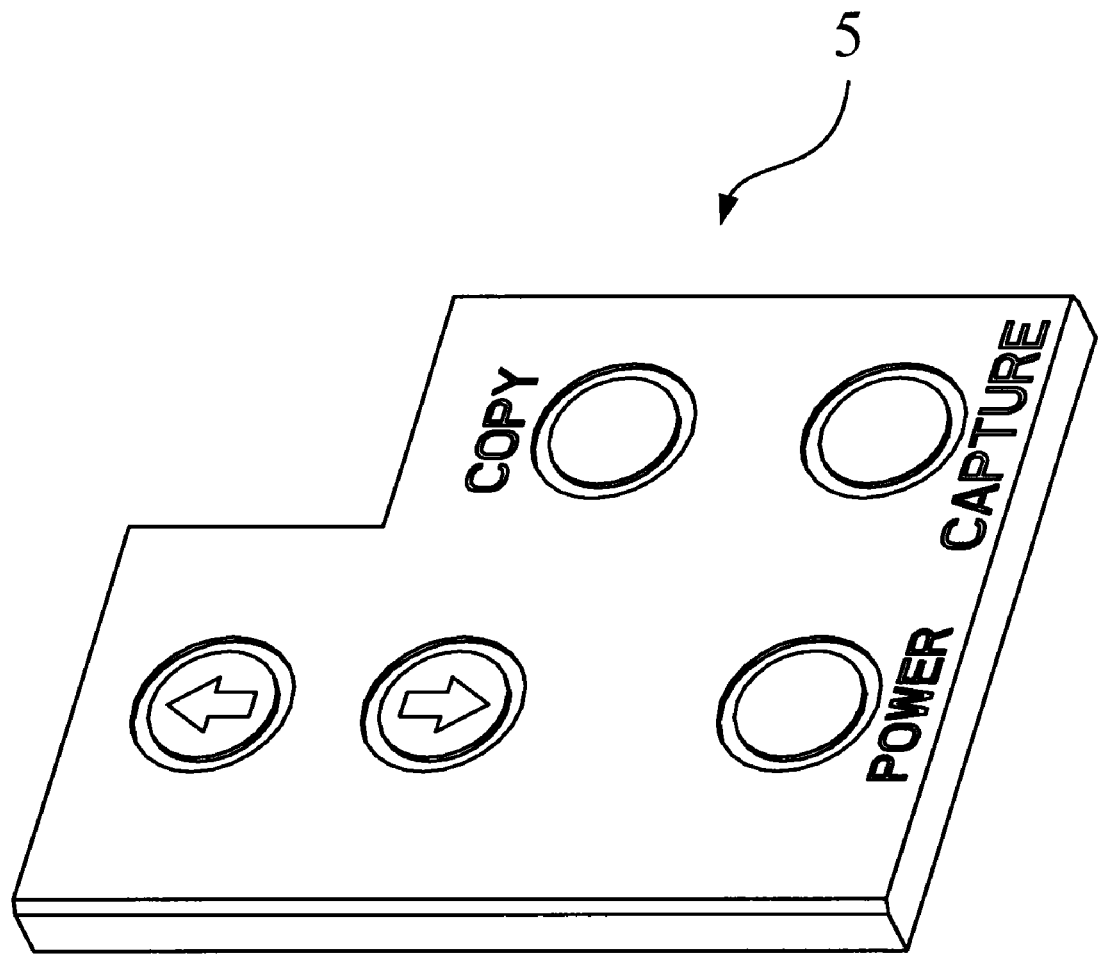
FIG. 3 is a three-dimensional diagram showing an appearance of a remote control in FIG. 2.

FIG. 3 is a schematic diagram showing an appearance of the remote control 5 in FIG. 2. In one embodiment, the wireless receiver 28 may be an infrared receiver. The corresponding remote control 5 may be a remote control with a specification of a personal computer memory card international association (PCMCIA), such as an express card remote control or a new card remote control, including an infrared transmitter. The corresponding switches (as shown in FIG. 3) of the remote control 5 are used to transmit the fourth request signal 50 or the fifth request signal 52, respectively.

In another embodiment, the wireless receiver 28 may be a bluetooth receiver. The remote control 5 may be a corresponding bluetooth transmitter for transmitting the fourth request signal 50 or the fifth request signal 52.

Compared with the prior art, the portable computer in the invention allows the users to conveniently and fast display the images stored in the storage device under the main-power-off state. In addition, the users only need to press the image capturing button. Thus, the images are instantly captured under the main-power-off state and the captured images are displayed on the display device. In addition, the captured images can be stored to the storage device for being displayed later. In the invention, basic elements of the portable computer are in cooperation with man-machine interface switches to realize the digital photo frame function under the main-power-off state.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable computer capable of performing a digital photo frame function under a main-power-off state, the portable computer comprising:
a base;
a display device including a frame pivotally connected to the base;
an image capturing device disposed at the frame;
an image capturing switch disposed at the frame and capable of being operated to output a first request signal;
a processor disposed in the base and electrically connected with the display device, the image capturing device, and the image capturing switch, in response to the first request signal, the processor driving the image capturing device to capture a first image under the main-power-off state, the processor instantly displaying the first image on the display device under the main-power-off state;
a first storage device disposed in the base and electrically connected with the processor, wherein the processor can store the captured first image to the first storage device under the main-power-off state; and
at least one image playing switch disposed at the frame and electrically connected with the processor, wherein the image playing switch can be operated to output a third request signal, and in response to the third request signal, the processor displays at least one image stored in the first storage device on the display device under the main-power-off state.

2. The portable computer according to claim 1, further comprising a file copying switch disposed at the frame and electrically connected with the processor, the base including at least one connection interface which is electrically connected with the processor and is used for connecting a second storage device, the second storage device storing at least one second image, wherein the file copying switch can be operated to output a second request signal, and in response to the second request signal, the processor copies the second image from the second storage device to the first storage device under the main-power-off state.

3. The portable computer according to claim 2, wherein the connection interface conforms to one specification selected from the group consisting of a universal serial bus (USB), an IEEE 1394 specification, and a serial digital input output (SDIO).

4. The portable computer according to claim 1, wherein the image playing switch can be operated to set a play mode.

5. The portable computer according to claim 4, wherein the play mode comprises a random play mode and a mode of playing in order.

6. The portable computer according to claim 1, further comprising a wireless receiver disposed in the base and electrically connected with the processor, the wireless receiver used to receive a fourth request signal from a remote control, in response to the fourth request signal, the processor displaying at least one image stored in the first storage device on the display device under the main-power-off state.

7. The portable computer according to claim 6, wherein the wireless receiver receives a fifth request signal from the remote control, in response to the fifth request signal, the processor drives the image capturing device to capture a third image under the main-power-off state, and the processor instantly displays the captured third image on the display device under the main-power-off state.

8. The portable computer according to claim 7, wherein the wireless receiver is an infrared receiver, and the remote control includes an infrared transmitter for transmitting the fourth request signal or the fifth request signal.

9. The portable computer according to claim 7, wherein the wireless receiver is a bluetooth receiver, and the remote control includes a bluetooth transmitter for transmitting the fourth request signal or the fifth request signal.

* * * * *